(12) United States Patent
Song et al.

(10) Patent No.: US 8,057,915 B2
(45) Date of Patent: Nov. 15, 2011

(54) ACOUSTICAL GYPSUM BOARD PANEL AND METHOD OF MAKING IT

(75) Inventors: W. David Song, Lake Forest, IL (US); Mark H. Englert, Libertyville, IL (US); Qiang Yu, Grayslake, IL (US); Martin W. Brown, Gurnee, IL (US); Richard B. Stevens, Crystal Lake, IL (US)

(73) Assignee: United States Gypsum Company, Chicago, IL (US)

( * ) Notice: Subject to any disclaimer, the term of this patent is extended or adjusted under 35 U.S.C. 154(b) by 46 days.

(21) Appl. No.: 11/807,980

(22) Filed: May 31, 2007

(65) Prior Publication Data
US 2008/0299413 A1  Dec. 4, 2008

(51) Int. Cl.
*B32B 19/00* (2006.01)

(52) U.S. Cl. .......... 428/688; 442/59; 442/149; 442/256; 442/386; 428/689; 428/703; 264/212; 156/39; 106/698; 106/772

(58) Field of Classification Search .............. 442/149, 442/256, 59, 386; 428/688, 689, 703; 264/212; 156/39; 106/698, 772
See application file for complete search history.

(56) References Cited

U.S. PATENT DOCUMENTS

| | | | |
|---|---|---|---|
| 3,565,650 A * | 2/1971 | Cordon et al. ............ 106/675 |
| 3,769,065 A * | 10/1973 | Dunn ........................ 264/122 |
| 3,852,083 A | 12/1974 | Yang | |
| 3,926,650 A | 12/1975 | Lange et al. | |
| 3,952,830 A | 4/1976 | Oshida et al. | |
| 4,086,098 A | 4/1978 | Le Ruyet et al. | |
| 4,130,175 A | 12/1978 | Hehmann | |
| 4,160,491 A | 7/1979 | Matsumoto et al. | |
| 4,293,344 A | 10/1981 | Joseph | |
| 4,403,006 A | 9/1983 | Bruce et al. | |
| 5,112,405 A * | 5/1992 | Sanchez ...................... 106/608 |
| 5,130,184 A | 7/1992 | Ellis | |
| 5,244,726 A | 9/1993 | Laney et al. | |
| 5,250,153 A | 10/1993 | Izard et al. | |
| 5,250,578 A | 10/1993 | Cornwell | |
| 5,395,438 A | 3/1995 | Baig et al. | |
| 5,395,571 A | 3/1995 | Symons | |
| 5,643,510 A | 7/1997 | Sucech | |
| 5,683,635 A | 11/1997 | Sucech et al. | |
| 5,753,871 A | 5/1998 | Kahara et al. | |
| 5,830,548 A | 11/1998 | Andersen et al. | |
| 5,964,934 A | 10/1999 | Englert | |
| 6,171,388 B1 | 1/2001 | Jobbins | |
| 6,340,388 B1 | 1/2002 | Luongo | |
| 6,342,284 B1 | 1/2002 | Yu et al. | |
| 6,387,172 B1 | 5/2002 | Yu et al. | |

(Continued)

*Primary Examiner* — Peter Y Choi
(74) *Attorney, Agent, or Firm* — Greer, Burns & Crain, Ltd.; David F. Janci, Esq.; Philip T. Petti, Esq.

(57) ABSTRACT

The acoustical product of the present invention comprises an acoustical product including a matrix of calcium sulfate dihydrate crystals and expanded perlite distributed throughout the matrix. The expanded perlite has a particle size distribution with at least 10% of the perlite having a particle diameter of 700 microns or more, and the amount of expanded perlite to calcium sulfate dihydrate is about 35% to about 75% by weight, based upon the dry weight of the calcium sulfate dihydrate. A dispersing agent and glass fibers having a particle length of about ¼ inch to about 1 inch are dispersed throughout the gypsum matrix.

14 Claims, 1 Drawing Sheet

U.S. PATENT DOCUMENTS

| | | |
|---|---|---|
| 6,443,258 B1 | 9/2002 | Putt et al. |
| 6,475,275 B1 | 11/2002 | Nebesnak et al. |
| 6,481,171 B2 | 11/2002 | Yu et al. |
| 6,632,550 B1 | 10/2003 | Yu et al. |
| 6,706,128 B2 * | 3/2004 | Sethuraman .................... 156/43 |
| 6,749,897 B2 | 6/2004 | Naji et al. |
| 6,780,356 B1 | 8/2004 | Putt et al. |
| 6,783,345 B2 | 8/2004 | Morgan et al. |
| 6,783,799 B1 | 8/2004 | Goodson |
| 6,800,131 B2 | 10/2004 | Yu et al. |
| 6,815,049 B2 | 11/2004 | Veeramasuneni et al. |
| 6,855,753 B1 | 2/2005 | Englert |
| 6,941,720 B2 | 9/2005 | DeFord et al. |
| 2001/0001218 A1 * | 5/2001 | Luongo ........................... 264/42 |
| 2002/0045074 A1 | 4/2002 | Yu et al. |
| 2002/0170467 A1 | 11/2002 | Naji et al. |
| 2002/0175126 A1 | 11/2002 | Naji et al. |
| 2003/0033040 A1 | 2/2003 | Billings |
| 2003/0084980 A1 | 5/2003 | Seufert et al. |
| 2003/0092784 A1 | 5/2003 | Tagge et al. |
| 2004/0231916 A1 | 11/2004 | Englert et al. |
| 2005/0055973 A1 | 3/2005 | Hagen, Jr. et al. |
| 2005/0188649 A1 | 9/2005 | Hagen, Jr. |
| 2006/0281886 A1 | 12/2006 | Bichler et al. |

* cited by examiner

ACOUSTICAL GYPSUM BOARD PANEL AND METHOD OF MAKING IT

BACKGROUND

This application relates to a gypsum board panel having improved acoustical properties. More specifically, it relates to a gypsum board panel that includes lightweight aggregate having a specific particle size distribution. The board is manufactured on a high speed line similar to gypsum wallboard.

Acoustical or ceiling panels are well known for providing a finished appearance to a ceiling area and also providing sound absorbency where needed. Ideally, the panels combine acoustic absorbency with durability for long life. Mineral wool is commonly used because it provides a porous fibrous structure for absorbing sound. Other common materials used in the manufacture of ceiling panels include fiberglass, expanded perlite, clay, gypsum, stucco, calcium carbonate and paper fiber.

Many ceiling panels are made in a manner similar to the process used to make paper or fiberboard. In this water-felting process, an aqueous dispersion of the fibers, aggregates, binders, and other additives is dispensed onto a porous surface or wire where the furnish is dewatered, both by gravity and by vacuum suction. The wet mat is dried in a convection oven, fissured and/or perforated to impart acoustical absorbency and then cut into desired lengths. If desired, the surface is painted to produce a finished panel. An example of such a panel is the AURATONE® ceiling tile made by USG Interiors (Chicago, Ill.).

Another process for making ceiling panels is by casting, as described in U.S. Pat. No. 1,769,519. A composition of mineral wool fibers, fillers, colorants, a binder such as cooked starch and water is placed in trays covered with paper or paper-backed foil. The composition is then screeded with a forming plate to the desired thickness. A decorative surface, such as an embossed pattern, is obtainable by imparting a pattern into the surface of the cast material by use of a screed bar or a patterned roll. ACOUSTONE® ceiling tile by USG Interiors (Chicago, Ill.) is an example of such a cast panel.

Both of these methods of making ceiling panels are relatively expensive because they utilize large amounts of water and energy. Hygroscopic binders, such as paper or starch, result in panels that are susceptible to sag. Sagging of the panel can be accentuated when the panel supports insulation or other loads or when subjected to high levels of humidity and temperature. The products require additional process steps, such as perforation, that increase the manufacturing cost. Additionally, these panels have very limited green strength prior to pressing or drying of the panel. This feature makes it difficult to manufacture the panels on a high-speed line, such as that used to make gypsum board panels.

Gypsum panels are less prone to sag and are manufactured efficiently in a high-speed process. However, gypsum is heavy and it lacks acoustical absorbency. It is currently adaptable for use as acoustical ceiling panels by including holes in the panels and positioning a sound-absorbing backing on the back of the perforated panel. While the holes provide some weight reduction and sound absorbance, they are not accepted by consumers as being aesthetically pleasing.

Two patents U.S. Pat. Nos. 6,387,172 and 6,481,171 have described acoustic gypsum compositions. Both describe the use of both fibrous calcined gypsum and non-fibrous calcined gypsum in gypsum products. Another gypsum panel having an acoustical layer is described in U.S. Patent Publication No. 2004/0231916. One embodiment of this panel has an acoustical layer of foamed gypsum formed on denser gypsum material for strength.

SUMMARY OF THE INVENTION

These and other problems are solved by the gypsum products of the present invention that can be made on a high-speed manufacturing line, yet have improved sound-absorption properties. More specifically, the gypsum products of this invention have a core of a particular structure that does not require perforation or specific facing materials to achieve acoustical absorption.

The acoustical product of the present invention includes a matrix of calcium sulfate dihydrate crystals and expanded perlite distributed throughout the matrix. The expanded perlite has a particle size distribution with at least 10% of the perlite having a particle diameter of 700 microns or more, and the amount of expanded perlite to calcium sulfate dihydrate is about 35% to about 75% by weight, based upon the dry weight of the calcium sulfate dihydrate. A dispersing agent and glass fibers having a particle length of about ¼ inch to about 1 inch are optionally dispersed throughout the gypsum matrix.

Products of this invention are advantageous because they are lightweight, yet provide improved sound absorbance. Sound absorbance, as measured by noise reduction coefficient (NRC), values of 0.70 are attainable using this formulation. Panels are light enough for use as ceiling panels, yet only a minimal reduction in nail pull strength results compared to panels using a conventional perlite particle size distribution. Light-weight panels reduce fatigue in the installers, allowing them to accomplish more in a given time period and reducing the cost of installation.

Further, these products can be manufactured on high-speed gypsum board manufacturing lines. Unlike fiber-board products that are made in individual molds, the present products can be made as a continuous strip, then cut into desired length and separated prior to entering the kiln. Because the product develops sufficient green strength prior to entering the kiln, the product can be handled without pressing. The improved green strength of this product also allows its manufacture without the need for a plurality of facing materials types.

The addition of foam to the gypsum slurry reduces its density, improves its acoustic property and maintains its natural slurry flowability. The foamed slurry spreads evenly over the forming table or the facing material with little or no spreading device required. Energy use is minimized and the manufacturing process is reduced by limiting the number of steps. Foam addition also creates foam voids where the gypsum matrix forms around a foam bubble.

DETAILED DESCRIPTION OF THE INVENTION

Figure 1:
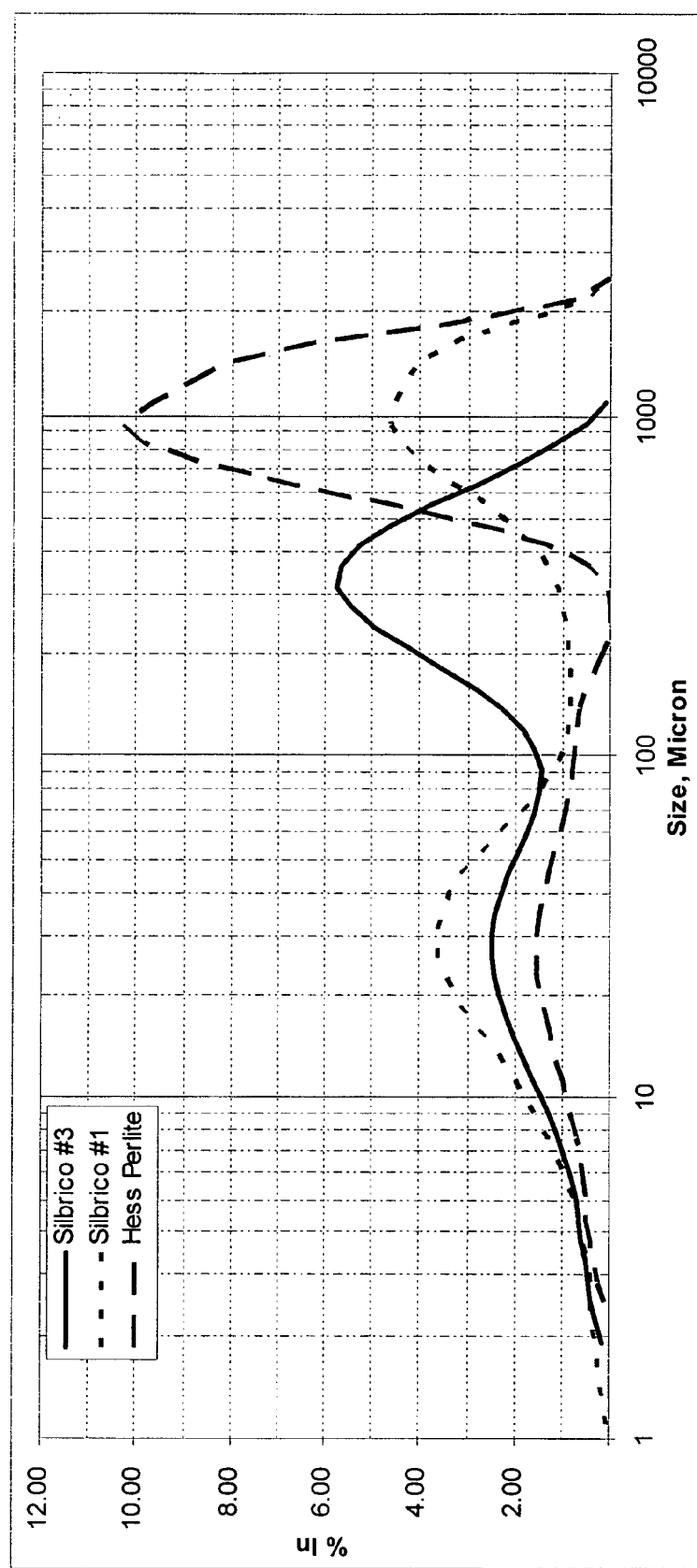
FIG. 1 is a graph of the particle size distributions of three expanded perlites used in Example 1.

An acoustical product having improved sound-absorbing properties is made. Expanded perlite having a particular particle size distribution is held in a gypsum matrix to provide improved sound absorbance. Unless otherwise noted, concentrations used in this description refer to percentages by weight based on the dry weight of the calcium sulfate hemihydrate.

A key component of the acoustical products is a lightweight aggregate having a particular particle size distribution. The particle size distribution of the lightweight aggregate has certain characteristics. A relatively large portion of the expanded perlite has a particle diameter greater than 500 microns. The larger particle size distribution limits tight packing of the particles, leaving voids to absorb sound. A preferred lightweight aggregate has a particle size distribution curve having a first peak in the range of about 500 microns to about 2000 microns. Another characteristic of the preferred expanded perlite size distribution is that at least 10% by weight of the aggregate has a particle size of 700 microns or larger. In other embodiments, the lightweight aggregate particle size distribution includes at least 20% or 25% by weight of the aggregate has a particle size distribution having a particle size of 700 microns or larger. Preferably, the particle size distribution also features at least 30% by weight of the lightweight aggregate having a particle size of 480 microns or larger.

In other embodiments, another preferred particle distribution of the lightweight aggregate has a bimodal distribution. Some smaller particles can be tolerated, but should not be so numerous so as to plug the voids created by the larger lightweight aggregate particles. In such cases, lightweight aggregate having a bimodal particle size distribution is preferred. In addition to the major peak described above, the bimodal distribution includes a second, minor peak between 10 and 100 microns. At least one embodiment has the major peak at 800 microns or higher. One embodiment has the major peak between about 800 microns and 1500 microns.

The net effect of the lightweight aggregate particle size distribution is that the aggregate particles form a close-packed structure such that inter-particle voids are created that enhance sound absorption. The particle size ranges noted above are examples of ranges that appear to produce the desired structure but should not be viewed as limiting.

The lightweight aggregate is provided in any amount to produce the desired amount of filler space, reduction in overall density and/or finished panel weight. For example, the lightweight aggregate is present in an amount of from about 5.0% to about 75% by weight of the calcined gypsum mass. Preferred lightweight aggregates include expanded perlite and glass beads.

In some embodiments, expanded perlite is the preferred lightweight aggregate. When perlite is heated, it softens and expands as entrained water turns into steam. Upon expansion, light, fluffy particles are obtained having a lower particle density than raw perlite. Preferred perlites include #1 Expanded Perlite (Silbrico Co., Hodgkins, Ill.) and a sieved perlite product from Hess Perlite (Hess Pumice Products, Inc., Malad, Id.). The Hess perlite consisted of perlite that passed through a 14 mesh screen and was retained on a 20 mesh screen.

Prior to use in the sound-absorbing filler, the expanded perlite is optionally at least partially coated with a coating. Preferred coatings include silicon coatings and polymeric coatings. The coatings are applied to the expanded perlite using any practical coating method. Spraying is the preferred method of applying the coating. While not wishing to be bound by theory, it is believed that the coating limits water absorption by reducing the amount of water that enters the interior of the aggregate particles. When less water is absorbed, less energy is required to drive off this excess water, reducing the kiln temperature or the residence time of the product in the kiln.

Calcined gypsum, also known as stucco or calcium sulfate hemihydrate, is preferably used to make the acoustical product. Any calcined gypsum comprising calcium sulfate hemihydrate or water-soluble calcium sulfate anhydrite or both is useful. Calcium sulfate hemihydrate produces at least two crystal forms, the alpha and beta forms. Beta calcium sulfate hemihydrate is commonly used in gypsum board panels, but is also contemplated that layers made of alpha calcium sulfate hemihydrate are also useful in this invention. Either or both of these forms is used to create a preferred acoustical layer that is at least 35% gypsum based on the weight of the acoustic product. Preferably, the amount of gypsum is at least 50%.

Long reinforcing fibers are added to improve the finished panel and enhance the green strength of the wet panel. Any type of reinforcing fibers, including organic fiber, cellulosic fiber, glass fiber, carbon fiber, metal fibers such as steel, plastic fibers are useful. Reinforcing fibers add strength to the composition while minimizing weight. The size of the reinforcing fibers is important. Long reinforcing fibers should be from about ¼" in length to about 1 inch. If the fibers are too short, they will not import sufficient strength to the panel. When the fibers are more than 1 inch (2.5 mm) long, they tend to build up in the mixer. Some natural fibers, such as cellulose, are limited in size. They can be considered to be long reinforcing fibers if they are longer than average for that fiber type. However, in such cases, it should be understood that the product strength will not be as good as products using manufactured fibers that can be made in the ¼ inch to 1 inch range. Up to 5% glass fiber by weight is added based on the dry stucco weight.

A foaming agent is used in amounts of 0.2% to about 1.5% by weight. In some embodiments, foam is generated, then added to the slurry downstream of the slurry mixer. Other embodiments combine the foaming agent with the slurry in the slurry mixer, follow by mixing or agitation to generate bubbles. When the calcium sulfate hemihydrate is hydrated to form calcium sulfate dihydrate, voids are left behind from the foam after the gypsum is set or interlocking gypsum crystals are formed, resulting in a lighter weight product. Preferred foaming agents include STEOL® CS-230 (Stepan Chemical, Northfield, Ill.).

Some embodiments of the acoustical product are made by a continuous process. In preparing the gypsum slurry, dry ingredients are first combined including calcium sulfate hemihydrate and the lightweight aggregate. Preferably, the dry ingredients are blended in a powder mixer. In other embodiments, the dry components other than stucco are simply distributed over the dry stucco as it moves along a conveyor, similar to gypsum board production.

All of the dry components are added to the water at the mixer to obtain a slurry. Sufficient water is added to the dry components to make a flowable slurry. A suitable amount of water exceeds 75% of the amount needed to hydrate all of the calcined gypsum to form calcium sulfate dihydrate. The exact amount of water is determined, at least in part, by the application with which the product will be used and the amount and type of additives used. Water content is determined, in part, by the type of calcined gypsum that is used. Alpha-calcined stucco requires less water to achieve the same flowability as beta-calcined stucco.

The process water quality will affect the properties of both the slurry and the set gypsum matrix. Salts and organic compounds are well known to modify the set time of the slurry, varying widely from accelerating to retarding gypsum hydration. Some impurities lead to irregularities in the structure as the interlocking matrix of dihydrate crystals forms, reducing the strength of the set product. Good quality water without contamination should be used in order to achieve desired product strength and consistency.

A water-to-solid ratio is calculated based on the weight of the water compared to the weight of the total solid in the formulation. Preferred ratios range from about 0.5:1 to about 3:1. Preferably, the calcined gypsum is primarily a beta hemihydrate in which case the water to solid ratio is preferably from about 0.7:1 to about 2:1, more preferably, from about 0.9:1 to 1.5:1.

Properties of the gypsum panel core are optionally modified by the use of additives as are used in other gypsum compositions. A set accelerator is also an optional component of this composition. "CSA" is a gypsum set accelerator comprising 95% calcium sulfate dihydrate co-ground with 5% sugar and heated to 250° F. (121° C.) to caramelize the sugar. CSA is available from United States Gypsum Company, Southard, Okla. plant, and is made according to commonly owned U.S. Pat. No. 3,573,947, herein incorporated by reference. HRA is calcium sulfate dihydrate freshly ground with sugar or dextrose at a ratio of about 2.5 to 7.5 pounds of sugar per 100 pounds of calcium sulfate dihydrate. HRA and its method of manufacture is further described in U.S. Pat. No. 2,078,199, herein incorporated by reference. Both of these are preferred accelerators. The use of any gypsum accelerator, or combinations thereof, in appropriate amounts is contemplated for use in this invention.

Binders in addition to the calcium sulfate hemihydrate are also optionally added to the slurry to improve the integrity of the set gypsum matrix and to improve bonding of the acoustical product to the optional facing material. Any suitable binder or combination of binders may be used. The binder is preferably included in the aqueous calcined gypsum slurry. Preferably, the binder is a starch, such as corn or wheat starch, a latex, such as polyvinyl acetate, acrylic and styrene butadiene latexes, or combinations thereof. A useful binder is an acrylic binder that forms a self-linking acrylic emulsion, such as RHOPLEX HA-16, available from Rohm and Haas (Philadelphia, Pa.). Acrylic binders are optionally used in amounts of from about 0.5% to about 5%, more preferably from about 0.8% to about 1.5%, by weight of the dry stucco weight.

The starch binder is optionally included in the acoustical panel. Either migrating or non-migrating starches are useful. Non-migrating starches are also applicable by solution directly to a paper backing layer to enhance bonding with the gypsum core. Starch is preferably present in amounts of from about 1% to about 10% by weight based on the dry stucco weight. Examples of pregelatinized, non-migrating starches useful in this acoustical layer include GemGel Starch (Manildra Group USA, Shawnee Mission, Kans.), USG95 Starch (United States Gypsum Co., Chicago, Ill.) and PCF1000 (Lauhoff Grain Co., St. Louis, Mo.). Examples of non-pregelatinized, non-migrating starches include Minstar 2000 and Clinton 106 Corn Starch (both from Archer Daniels Midland Co., Decatur, Ill.). Examples of migrating starches include Hi-Bond Starch and LC-211 starch (both from Archer Daniels Midland Co., Decatur, Ill.).

Another optional component of the acoustic layer is a water reducing agent or dispersant that enhances the fluidity of the slurry and makes it flowable when less water is added. Naphthalene sulfonates, melamine compounds and polycarboxylates are preferred water reducing agents and are included in the slurry in amounts of up to 2% based on the dry weight of the stucco. Preferably at least 0.5% dispersant is used. Where the water reducing agent is added in the form of a liquid, amounts are to be calculated based on the dry solids weight. If naphthalene sulfonates are used, some embodiments use those with molecular weights in the range of about 8,000 to about 27,000 Daltons. Preferred water reducing agents are DiloFlo GW (GEO Specialty Chemical, Lafayette, Ind.) and EthaCryl 6-3070 (Lyondell Chemical Co., Houston, Tex.). Suitable polycarboxylates include those having a comb structure with polyalkyl ethers, such as MELFLUX 1641, 2641 2651F dispersants, which are products of BASF Construction Polymers, GmbH (Trostberg Germany) and are supplied by BASF (Kennesaw, Ga.). Preferably, the dispersant is a naphthalene sulfonate having a molecular weight in the 8,000-27,000 Dalton range.

One or more strength enhancing materials are optionally included in the slurry to promote green (wet) strength, dry strength and/or dimensional stability. Preferably, the strength enhancing material is a trimetaphosphate compound, an ammonium polyphosphate having 500-3000 repeating units and a tetrametaphosphate compound, including salts or anionic portions of any of these compounds. Hexametaphosphate compounds are effective for enhancing sag resistance, but are less desirable because they act as set retarders and reduce strength. Enhancing materials are described in commonly owned U.S. Pat. No. 6,342,284. Trimetaphosphate compounds are especially preferred. The strength enhancing materials are used in any suitable amount, preferably up to about 1%, up to about 0.3% or from about 0.004% to about 2% by weight based on the dry weight of the ingredients.

Foam is added to the slurry as it exits the slurry mixer to provide fluidity to the mix and to promote formation of voids in the set gypsum matrix, thereby improving the acoustic absorption and reducing the density. Any conventional foaming agents known to be useful in gypsum products are useful in this application. Preferably, the foaming agent is selected so that it forms a stable foam cell in the acoustical core structure. More preferably, at least some of the voids interconnect so as to form an open cell structure. Suitable foaming agents include alkyl ether sulfates and sodium laureth sulfates, such as STEOL® CS-230 (Stepan Chemical, Northfield, Ill.). The foaming agent is added in an amount sufficient to obtain the required fluidity in the slurry and desired acoustical characteristics in the acoustical core structure. Preferably, the foaming agent is present in amounts of about 0.003% to about 2.0% based on the weight of the dry stucco, and more preferably from about 0.005% to about 1.0%. Optionally, a foam stabilizer is added to the aqueous calcined gypsum slurry in a suitable amount.

The calcined gypsum, expanded perlite and optional dry components are combined with water in the slurry mixer to form the slurry. Preferably, all dry components, such as the calcined gypsum, aggregate, set accelerator, binder and fibers, are blended in a powder mixer prior to addition to the water. Liquid ingredients are added directly to the water before, during or after addition of the dry components. After mixing to obtain a homogeneous slurry, the slurry exits the slurry mixer where the foam is added.

Prior to being added to the slurry, a foaming agent is combined with water and air to make a foam, which is then added to the slurry at the discharge of the slurry mixer. In other embodiments, the foaming agent is added to the mixer where high shear agitation generates bubbles. Once the foam is added to the slurry, it is discharged to a moving conveyor, either directly onto the conveyor surface or onto the optional facing material.

Some embodiments of the invention include one or more facing materials to support the acoustic layer during manufacture by transferring stresses across the facing material, especially while the panel is wet. It is analogous to the face paper commonly used in gypsum wallboard manufacture. A "front face" is defined as that face of the acoustical product that is adjacent to the space where sound absorption is desired. The "back face" is the face that is opposite the front face. The facing material includes a front facing material, a back facing material or both. In some embodiments, the back facing material is a normal wallboard paper, including manila paper or kraft paper, non-woven glass, metallic foil or combinations thereof. An example of a non-woven glass facing material is Johns Manville Dura-Glass Mat Series 5000 (Denver, Colo.). Where paper is selected as the back face facing material, multi-ply paper, such as conventional wallboard paper, is useful. The number of plies optionally varies from 1-8 plies, depending on the paper chosen.

Another optional facing material is a scrim layer. It is positioned, for example, on the front face adjacent to the gypsum core. A screen layer is also useful on the back face. Preferably, the scrim layer is porous to facilitate attachment of the gypsum core and to facilitate drying of the gypsum matrix. Any material that provides support for the acoustical layer and has expansion properties compatible with the facing material, if used, is useful as scrim material. Some embodiments include non-woven fiberglass scrims, woven fiberglass mats, other synthetic fiber mats such as polyester and combinations thereof.

Other embodiments include any facing materials that are acoustically transparent. A non-woven glass or fabric is an example of an acoustically transparent useful as the front face facing material. The front face facing material is bondable to a gypsum core formed by the slurry using any known binder. A preferred facing material is a non-woven glass mat JM 5022 (Johns Manville, Denver, Colo.).

At least one embodiment of the invention utilizes a single type of material for both the facing material and the facing material. At least one other embodiment has a scrim layer on the front face and paper on the back face.

The facing material, if used, is positioned on a conveyor to receive the gypsum slurry. The gypsum slurry is poured onto the facing material using a continuous process similar to that used to make gypsum panels. From the mixer, the slurry is preferably transferred to the facing material using a flexible conduit. The gypsum slurry is made fluid enough that it will spread over the surface of the backing material with little or no spreading necessary. If a facing material is applied to another face, it is applied next while the gypsum slurry is still fluid, sandwiching the slurry between the two facing materials. The core, and optional covering materials, if present, then pass under a screed bar to make the gypsum core a uniform thickness.

It is not necessary to perforate the gypsum products of this invention to obtain good sound absorbency. Perforation of the core and/or one or more facing materials is entirely optional. Preferably, the gypsum is not perforated to reduce the number of steps required to manufacture the product and thereby reduce the cost. Where perforation is desired, the depth and spacing of perforations are the same as those taught in the prior art.

As soon as the gypsum core has set sufficiently to achieve desired green strength to be easily handled, the gypsum product is cut and transferred to another conveyor then into a kiln for drying. In the kiln, water in excess of that needed for hydration of the calcium sulfate hemihydrate to calcium sulfate dihydrate is driven off by evaporation. The kiln temperatures and air flow rate are controlled to evaporate the water quickly, but not so high as to calcine hydrated gypsum back to the calcium sulfate hemihydrate or anhydrate form. The kiln optionally includes dual zones to achieve optimum drying conditions.

At least one embodiment of this acoustical product is made by a batch process. All powder materials, including stucco, the lightweight aggregate, binders, and fibers, are pre-mixed in a blender. Liquid additives, such as the foaming agent and dispersant, are mixed with water to form a process solution of 0.1%-1% concentration. A facing layer is placed onto a base. The liquid components and dry components are mixed in a suitable mixer. The mixing time is sufficient to yield a uniform slurry, but less than the set time of the slurry. The slurry is poured from the mixer and spread evenly onto a first facing material to form the core layer. The second facing layer is then applied to the slurry and pressed into place to aid its adhesion with the core material. After drying panel in a kiln, the dried panel is cut to size. Preferred products from this gypsum slurry include acoustical ceiling panels and acoustical gypsum panels.

EXAMPLE 1

A formulation for an acoustical panel included the components of Table 1 and was made according to the steps described above. All component weights were measured on the basis of pounds per 1000 ft$^2$ (MSF). The percentage amounts of each component are also given as a weight based on 1000 pounds of dry stucco.

TABLE 1

| Component | Lbs/MSF | % based on stucco dry weight |
|---|---|---|
| Stucco | 834 | |
| HRA | 7 | 0.84% |
| Expanded Perlite | 427 | 51.2% |
| Starch | 26 | 3.12% |
| Glass Fiber | 21 | 2.52% |
| Sodium trimetaphosphate | 16 | 1.92% |

Sample boards were made using each of the three expanded perlites listed in Table 2 in the composition of Table 1. Water was added in amounts of 1 part water to 1 part dry solids on a weight basis. Foam was generated using a 1% solution by weight of Steol CS-230. Target densities of 20-25 pounds per cubic foot were obtained by adding foam until the target density was obtained. The properties of each of the perlites, as well as the properties of the board it produced, are shown in Table 2 as well. Graphs of the particle size distribution of each of these three perlites are shown in FIG. 1.

The Noise Reduction Coefficient ("NRC") is a measure of the sound absorption property of the product. Testing was performed per ASTM C423, herein incorporated by reference. An NRC value of 0.7 means that approximately 70% of the sound was absorbed by the board, while 30% was reflected back into the environment. Products made with expanded perlite of the invention have significantly higher NRC values than that of the comparative example, indicating improved sound absorbance properties.

Strength of the product is measured by the Modulus of Rupture ("MOR"). Testing is performed according to ASTM Standard C367, herein incorporated by reference. This test measures the breaking load of the product. Even with the change in void distribution, the embodiments of the invention are at least as strong as the product of the comparative example.

TABLE 2

| Perlite Property | Hess Perlite | Silbrico #1 | Silbrico #3 Comparative Example |
|---|---|---|---|
| Particle Size Distribution, larger | | | |
| 100 microns | 74.59% | 45.86% | 58.30% |
| 275 microns | 71.61% | 39.63% | 36.99% |
| 480 microns | 67.19% | 32.67% | 10.23% |
| 700 microns | 56.00% | 26.85% | 3.66% |
| Board Properties | | | |
| NRC | 0.68 | 0.70 | 0.40 |
| MOR, psi | 205 | 286 | 224 |
| Density, pcf | 20 | 24 | 21 |

Silbrico #3 perlite, having a more conventional particle size distribution, produces a product that is inferior to perlites having a greater number of large particles. Expanded perlites having more than 20% of the particles greater than 700 microns resulted in board having better MOR and higher NRC.

While a particular embodiment of the high strength acoustical panel has been shown and described, it will be appreciated by those skilled in the art that changes and modifications may be made thereto without departing from the invention in its broader aspects and as set forth in the following claims.

What is claimed is:

1. An acoustical product comprising:
   a matrix of calcium sulfate dihydrate crystals;
   a lightweight aggregate distributed throughout the matrix, said lightweight aggregate having a bimodal particle size distribution curve having a first maximum in the range of 500 to 2000 microns and a second maximum in the range of 10 to 100 microns, and wherein the ratio of lightweight aggregate to calcium sulfate dihydrate ranges from about 35% to about 75% by weight, based upon the dry weight of the calcium sulfate dihydrate;
   a foaming agent comprising at least one of alkyl ether sulfates and sodium laureth sulfates;
   a dispersing agent; and
   long reinforcing fibers distributed throughout said calcium sulfate dihydrate matrix.

2. The product of claim 1 wherein said long reinforcing fibers have a fiber length of about ¼ inch to about 1 inch.

3. The product of claim 1 wherein said lightweight aggregate is expanded perlite.

4. The product of claim 3 wherein said expanded perlite is treated with a coating.

5. The product of claim 4 wherein said coating comprises at least one of the group consisting of a silicone compound, a film-forming, thermoplastic polymer and combinations thereof.

6. The product of claim 1 further comprising a strength enhancing additive.

7. The product of claim 6 wherein said strength enhancing additive is a trimetaphosphate compound.

8. The product of claim 1 further comprising at least one of a starch, a binder and a dispersant.

9. The product of claim 1 wherein said product is an acoustical ceiling product.

10. The product of claim 1 wherein said product is an acoustical gypsum board panel.

11. The product of claim 1 wherein said calcium sulfate dihydrate comprises hydrated calcium sulfate hemihydrate of the alpha form or beta form.

12. The product of claim 1 wherein said acoustical product further comprises an acoustically transparent facing on a front face and a paper facing on a back face.

13. The product of claim 1 wherein said bimodal particle size distribution comprises at least 20% by weight of the aggregate having a particle size of 700 microns or larger.

14. The product of claim 13 wherein said bimodal particle size distribution comprises at least 25% by weight of the aggregate having a particle size of 700 microns or larger.

* * * * *